US010688516B2

(12) United States Patent
Medard et al.

(10) Patent No.: US 10,688,516 B2
(45) Date of Patent: Jun. 23, 2020

(54) APPLICATION HEAD OF A COATING PRODUCT ON A SURFACE TO BE COATED AND APPLICATION SYSTEM COMPRISING SUCH AN APPLICATION HEAD

(71) Applicant: Exel Industries, Epernay (FR)

(72) Inventors: Cyrille Medard, Paris (FR); Michel Colrat, Paris (FR); Eric Prus, Paris (FR); Nicolas Chouan, Paris (FR)

(73) Assignee: Exel Industries, Epernay (FR)

( * ) Notice: Subject to any disclaimer, the term of this patent is extended or adjusted under 35 U.S.C. 154(b) by 207 days.

(21) Appl. No.: 15/829,900

(22) Filed: Dec. 2, 2017

(65) Prior Publication Data

US 2018/0169688 A1 Jun. 21, 2018

(30) Foreign Application Priority Data

Dec. 15, 2016 (FR) ...................................... 1662546

(51) Int. Cl.
*B05B 13/02* (2006.01)
*B05B 7/08* (2006.01)
(Continued)

(52) U.S. Cl.
CPC .......... *B05B 13/0278* (2013.01); *B05B 1/169* (2013.01); *B05B 5/03* (2013.01); *B05B 5/087* (2013.01); *B05B 7/0075* (2013.01); *B05B 7/0884* (2013.01); *B05B 12/04* (2013.01); *B05B 12/126* (2013.01); *B05B 12/1472* (2013.01); *B05B 12/18* (2018.02); *B05B 12/22* (2018.02); *B05B 13/0431* (2013.01); *B05B 13/0452* (2013.01); *B25J 15/0441* (2013.01);
(Continued)

(58) Field of Classification Search
CPC ....... B05B 1/169; B05B 5/085; B05B 7/0807; B05B 7/0846; B05B 7/0884; B05B 12/22; B05B 13/0278; B05B 13/0431; B05B 13/0452
See application file for complete search history.

(56) References Cited

U.S. PATENT DOCUMENTS 4,072,772 A * 2/1978 Franz .................... B05B 7/0884 427/164
4,923,743 A * 5/1990 Stewart, Jr. ............. B05B 7/066 427/288
(Continued)

FOREIGN PATENT DOCUMENTS

DE 4128590 A1 3/1993
DE 199 38 114 A1 2/2001
(Continued)

OTHER PUBLICATIONS

Ghasem et al., Industrial Sprays and Atomization, Jan. 1, 1992, pp. 7-33.

(Continued)

*Primary Examiner* — Ryan A Reis
(74) *Attorney, Agent, or Firm* — Soquel Group LLC

(57) ABSTRACT

An application head of a coating product on a surface to be coated comprising at least two spray nozzles for the coating product, each spray nozzle suitable for spraying the coating product in the form of an aerosol stream, while simultaneously creating several droplets having a diameter smaller than the diameter of the outlet orifice of the spray nozzle.

17 Claims, 5 Drawing Sheets

(51) Int. Cl.

| | |
|---|---|
| ***B05B 12/22*** | (2018.01) |
| ***B05B 1/16*** | (2006.01) |
| ***B05B 5/08*** | (2006.01) |
| ***B05B 12/18*** | (2018.01) |
| ***B05B 12/14*** | (2006.01) |
| ***B05B 13/04*** | (2006.01) |
| ***B05B 12/04*** | (2006.01) |
| ***B05B 12/12*** | (2006.01) |
| ***B25J 15/04*** | (2006.01) |
| ***B05B 5/03*** | (2006.01) |
| ***B05B 7/00*** | (2006.01) |
| *B05B 15/55* | (2018.01) |
| *B05C 5/02* | (2006.01) |
| *B05B 1/12* | (2006.01) |
| *B05B 1/08* | (2006.01) |
| *B05B 12/00* | (2018.01) |

(52) U.S. Cl.

CPC ................. *B05B 1/083* (2013.01); *B05B 1/12* (2013.01); *B05B 12/00* (2013.01); *B05B 15/55* (2018.02); *B05C 5/0291* (2013.01)

(56) References Cited

U.S. PATENT DOCUMENTS

| | | | | |
|---|---|---|---|---|
| 5,738,727 | A * | 4/1998 | Cebola | B05B 5/08 118/629 |
| 7,770,826 | B2 * | 8/2010 | Ballu | B05B 12/08 239/223 |
| 2005/0227013 | A1 * | 10/2005 | Colbert | B05B 1/202 427/421.1 |
| 2007/0009656 | A1 * | 1/2007 | Nagase | B05B 1/14 427/154 |
| 2007/0128343 | A1 * | 6/2007 | Chappa | A61L 27/34 427/2.1 |
| 2009/0020621 | A1 | 1/2009 | Clark et al. | |
| 2010/0065292 | A1 | 3/2010 | Baker | |
| 2010/0224702 | A1 * | 9/2010 | Kwok | B05B 7/0861 239/397 |

FOREIGN PATENT DOCUMENTS

| | | | |
|---|---|---|---|
| DE | 10 2010 019 612 | A1 | 11/2011 |
| DE | 10 2012 005 650 | A1 | 9/2013 |
| DE | 10 2004 049 471 | A1 | 4/2016 |
| JP | 64-022372 | A | 1/1989 |
| WO | 03066239 | A1 | 8/2003 |
| WO | 04085082 | A1 | 10/2004 |

OTHER PUBLICATIONS

French Patent Application No. 16 62546, INPI Rapport de Recherche Préliminaire, Aug. 3, 2017 (4 pages).

Nasr, Ghasem G. et. al., Industrial Sprays and Atomization, "Background on Sprays and Their Production," Chapter 2, Springer-Verlag, London, Jan. 1, 2002, pp. 7-33.

Rapport de Recherche Europeenne for EP Patent Application No. 17207220, Apr. 9, 2018, 2 pages.

* cited by examiner

APPLICATION HEAD OF A COATING PRODUCT ON A SURFACE TO BE COATED AND APPLICATION SYSTEM COMPRISING SUCH AN APPLICATION HEAD

CROSS REFERENCE TO RELATED APPLICATIONS

This application claims priority under 35 USC § 119 of French Patent Application No. 16 62546 filed on Dec. 15, 2016.

FIELD OF THE INVENTION

The present invention relates to an application head of a coating product on a surface to be coated. The present invention also relates to an application system of a coating product on a surface to be coated comprising such an application head.

BACKGROUND OF THE INVENTION

In the field of industrial painting, application systems are known for depositing a coating product, such as paint, on a surface to be coated, for example on a mechanical part.

It is for example known to spray paint sprayed in a stream of droplets in the form of a wide aerosol stream, or aerosol, using a rotary bowl sprayer or a pneumatic gun. These techniques make it possible to coat surfaces with a large surface area and a high application speed, so as to be compatible with production rhythms in industrial production lines, for example in the automotive industry.

These known techniques are not, however, fully satisfactory for certain applications, in which good application precision of the paint is desired. In particular, it is necessary for the paint to be applied in the correct location of the surface to be coated.

In particular, these technologies do not make it possible to have good control over the location where the paint droplets are deposited. The application of the coating product on the target area of the surface to be coated is accompanied by an undesired spillage outside this target area, called "overspray". It is estimated that the transfer rate, or deposit yield, obtained using these techniques, defined as the ratio between the quantity of paint deposited on the target area and the quantity of paint sprayed, is no more than 80%. This means that up to 20% of the paint is deposited outside the areas where one wishes to deposit it.

SUMMARY OF THE DESCRIPTION

The invention more particularly aims to resolve these drawbacks by proposing an application head of a coating product on a surface to be coated, making it possible to apply the product with higher application precision than the existing technologies, a high application quality and a high deposit yield, while spraying the coating product over a large surface area.

To that end, the invention relates to an application head of a coating product on a surface to be coated, this application head including at least two spray nozzles for the coating product, each suitable for spraying the coating product in the form of an aerosol stream, by simultaneously creating several droplets having a diameter smaller than the diameter of the outlet orifice of the spray nozzle.

Owing to the invention, by combining several spray nozzles each creating an aerosol stream of coating product, the application head is thus able to deposit a wide enough strip of coating product on the surface to be coated. Furthermore, by creating several small aerosol streams rather than a single large aerosol stream, the surface outside the target area where the coating product is accidentally deposited is also reduced. Like the aerosol streams become combined, the uncontrolled droplets from each of the streams combine with the droplets from the adjacent stream. The yield of the application is therefore greatly increased.

According to advantageous but optional aspects of the invention, such an application head may incorporate one or more of the following features, considered alone or in any technically allowable combination:

- the spray nozzles are spaced apart in pairs by a distance comprised between 0.1 cm and 2 cm, such that the aerosol streams are in contact with one another at the surface to be coated.
- the spray nozzles are arranged so as to obtain an overlap between the aerosol streams produced by these nozzles at the surface to be coated, preferably with an overlap rate between the aerosol streams produced by two immediately adjacent spray nozzles being greater than or equal to 5%, or substantially equal to 50%, or substantially equal to 66%.
- the diameter of the outlet orifice of each spray nozzle is greater than or equal to 100 μm.
- the spray nozzles are arranged such that the produced aerosol streams overlap at least partially in pairs to form a composite aerosol stream having a width greater than 20 mm at the surface to be coated.
- the application head includes one or several additional spray nozzles, separate from the spray nozzles, the additional spray nozzles being suitable for generating a dropwise stream of coating product.
- the additional spray nozzles being positioned on at least one lateral edge of the application head and/or adjacent to spray nozzles.
- the additional spray nozzles have an outlet orifice diameter smaller than the diameter of the outlet orifice of the spray nozzles.
- the additional spray nozzles are supplied by a secondary supply circuit separate from the supply circuit of the spray nozzles, so as to spray an additional coating product separate from the coating product sprayed by the spray nozzles.
- the spray nozzles are aligned with one another in columns and/or rows.
- the application head includes an application device for a stream of air guiding the sprayed coating product, comprising air discharge orifices suitable for spraying a stream of guide air adjacent to at least part of the aerosol streams.
- the application head includes a removable or retractable mask, to laterally clip the aerosol stream emitted by at least some of the spray nozzles.
- the application head includes at least one electrode suitable for applying an electrical field on the aerosol streams emitted by the spray nozzles, the surface to be coated being connected to an electric ground of the system.
- the mask is made from an electrically conductive material and is suitable for being connected to an electrically polarizing circuit to electrically polarize this mask, the coating product being electrically polarized beforehand with an opposite polarity.

According to another aspect, the invention relates to an application system of a coating product on a surface to be coated, comprising a multiaxial industrial robot provided with an articulated arm and an application head of the coating product fastened on the articulated arm, the application head being according to the invention.

Lastly, according to advantageous but optional aspects of the invention, such a system may incorporate one or more of the following features, considered alone or in any technically allowable combinations:

- the system is suitable for the distance between the application head and the surface to be coated to be less than 200 mm, preferably comprised between 5 mm and 50 mm, still more preferably comprised between 10 mm and 30 mm.
- the application head is fastened to the articulated arm removably using a magnetic fastening device.

BRIEF DESCRIPTION OF THE DRAWINGS

The invention will be better understood and other advantages thereof will appear more clearly in light of the following description of one embodiment of such an application and an application system, provided solely as a non-limiting example and done in reference to the appended drawings, in which.

DETAILED DESCRIPTION

Figure 1:
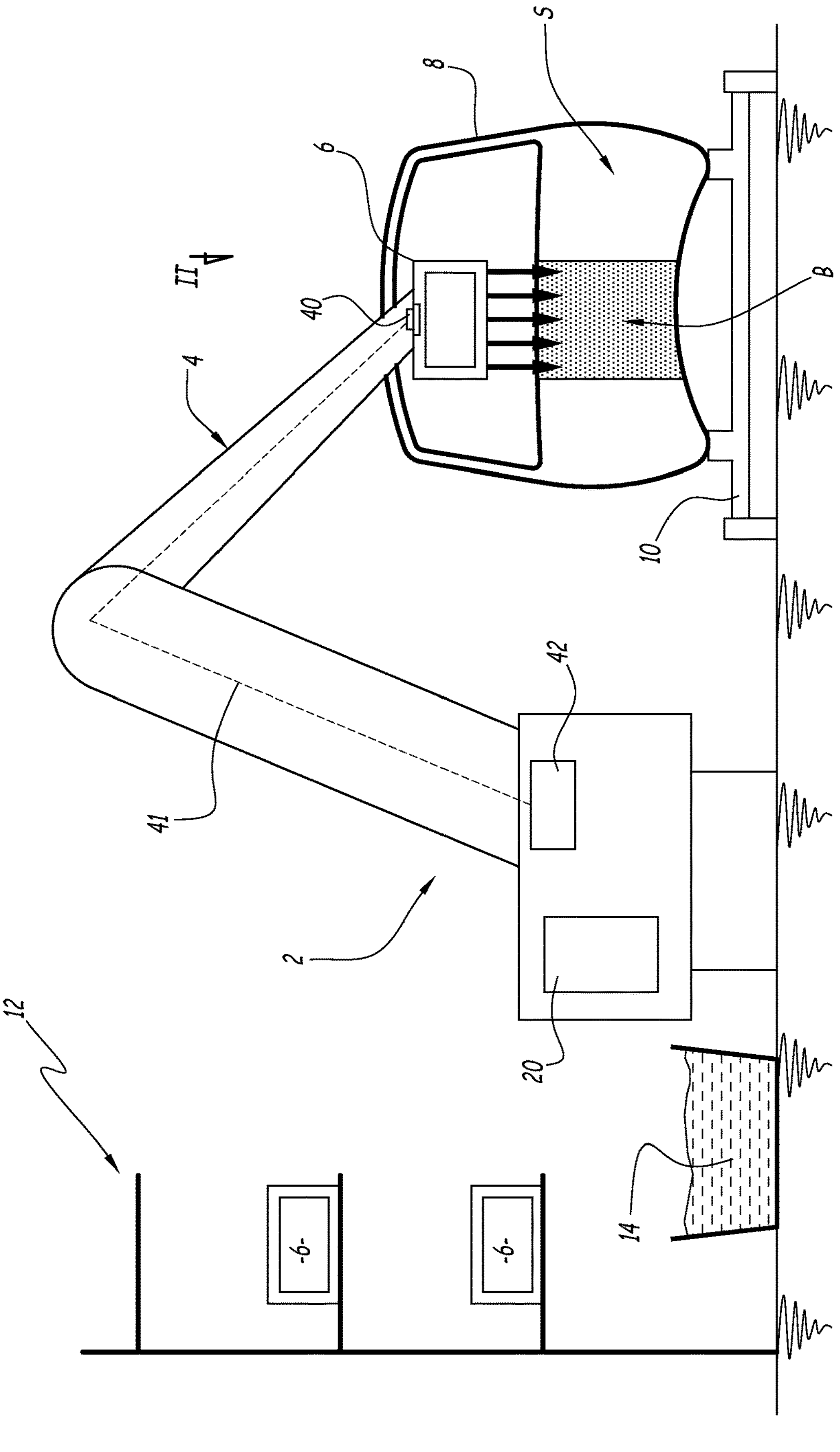
FIG. 1 is a schematic illustration of an application system of a coating product on a surface to be coated, including an application head according to the invention.

FIG. 1 shows an application system 1 of a coating product, for example in liquid form. The system 1 comprises a multiaxial industrial robot 2 provided with an electronic control unit 20, and articulated arm 4 and an application head 6 for the coating product secured to one end of the arm 4.

The system 1 is intended to apply, using the head 6, a coating product on a surface S to be coated. In this example, the surface S is an outer face of a mechanical part 8 mounted on a support 10. For example, the support 10 is a conveyor belt.

In this description, the parts 8 are automobile parts, for example metal vehicle body elements. The coating product is a liquid industrial paint, for example a base layer, intended to be applied on the parts 8.

Alternatively, the coating product may be different. As an illustration, it may be a varnish, an adhesive or a putty. Likewise, the system 1 can be used for applications other than the automotive industry, for example for the aeronautic industry or to coat plastic parts.

The system 1 is in particular configured to move the application head 6 relative to the surface S, using the arm 4, and following a predefined trajectory. For example, the arm 4 is provided with motors, not illustrated, that are controlled by the control unit 20 based on a movement program.

Advantageously, the application head 6 is secured removably using a magnetic fastening device 40 controllable by the control unit 20. For example, the arm 4 is provided with an electromagnet controllable by the control unit 20. The application head 6 is provided with a permanent magnet intended to cooperate with the electromagnet supported by the arm 4.

Thus, the application head 6 can be replaced selectively and automatically by the robot 2 during application operations of the coating product. For example, application heads of different sizes are used successively by the robot 2, based on the shape of the part 8 and therefore dimensions of the surface S, to apply the coating product on a greater or smaller width.

To that end, the system 1 optionally includes a magazine 12 for storing application heads, as well as a rinsing box 14 for the application heads 6. The box 14 makes it possible to clean the application heads to rid them, for example using a cleaning solution, of the application product that they contain after they have been used.

The system 1 further includes a device for supplying coating product, suitable for conveying the coating product toward the application head 6 with an appropriate pressure. This supply device here is schematically illustrated by a supply pipe 41 that is connected, on the one hand, to a coating product reservoir, and on the other hand, to an opening 602 for supplying the application head 6.

According to one variant, the coating product can be obtained from mixing a first component and a second component provided separately to the system 1. In this case, the system 1 includes a mixer 42 fluidly connected to the supply system. In FIG. 1, the mixer 42 is illustrated connected upstream from the supply pipe 41. Alternatively, this mixer 42 can be incorporated into the application head 6, within a supply circuit 600 of the application head 6, described below.

Figure 2:
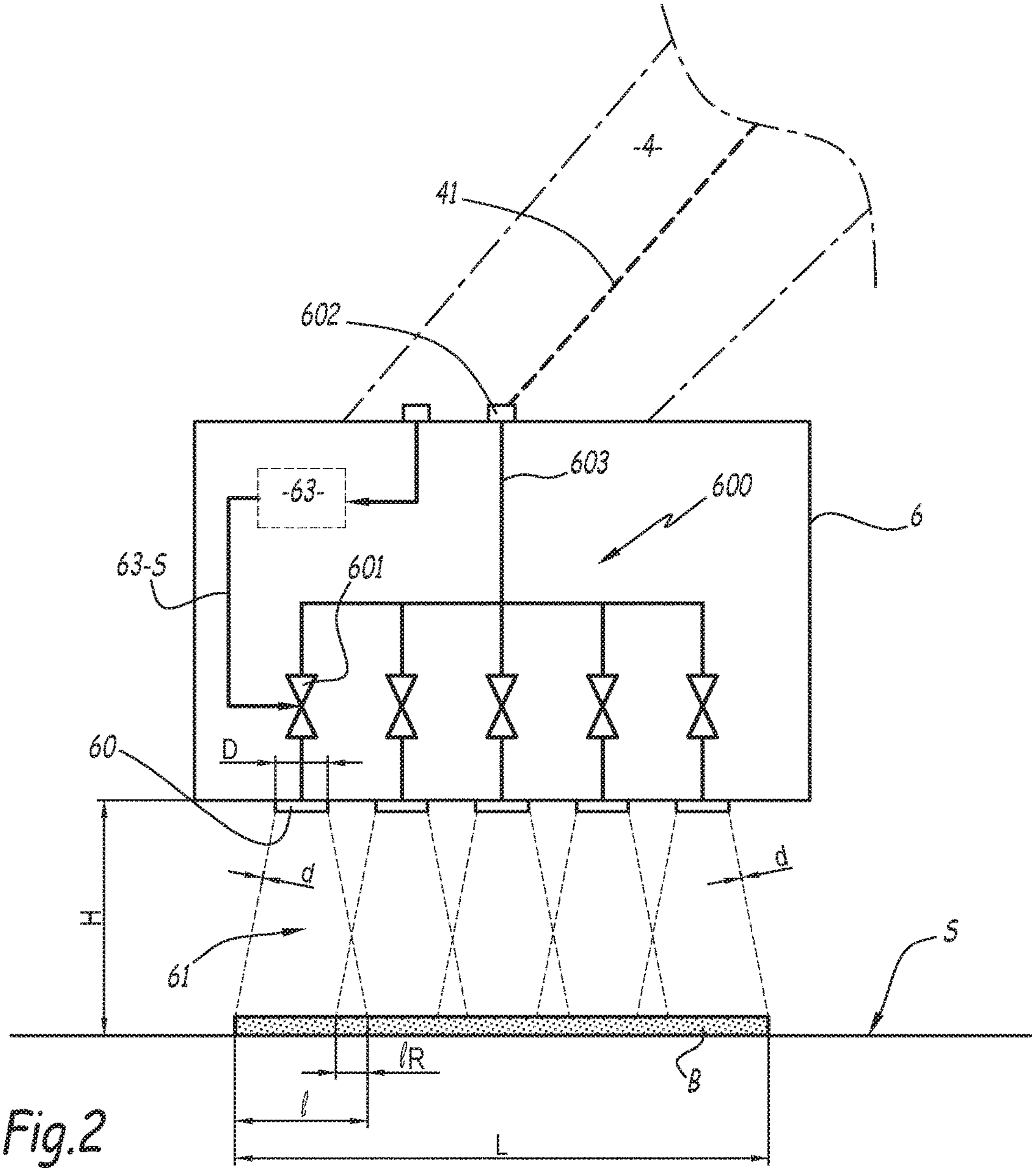
FIG. 2 is a simplified illustration of the application head of FIG. 1, according to a cross-section oriented perpendicular to a movement direction of the application head.

The application head 6 is suitable for spraying, on the surface S, the coating product coming from the supply device of the system 1. As illustrated in FIG. 2, the application head 6 includes at least two spray nozzles 60 of the coating product. Each nozzle 60 is suitable for spraying the coating product in the form of an aerosol stream 61.

Within the meaning of the present description, an aerosol stream is a set of droplets of coating product in suspension in the air and sprayed essentially in the form of a stream. In this example, the droplets forming the aerosol stream 61 are sprayed with a speed essentially oriented along one axis, or propagation direction. For example, the propagation axis is arranged perpendicular to the surface of the outlet of the nozzle 60, here a vertical direction. Alternatively, this propagation axis is arranged with a nonzero angle relative to this surface. The head 6 is oriented such that the propagation axis is perpendicular to the surface S to be coated.

At least some of the droplets of the aerosol stream 61 are created simultaneously by the nozzle 60. Thus, the aerosol stream 61 in particular differs from a stream of coating product created by a spray nozzle of the dropwise type, for example of the "continuous inkjet" type or the "drop on demand" type, in which the drops of coating product are created sequentially, one by one.

For example, the application head 6 includes a housing and a supply circuit 600 housed inside the housing. The circuit 600 includes a supply inlet 602 intended to be connected to the supply pipe 41 and a plurality of channels 603 allowing the circulation of the coating product from the inlet 602 toward the spray nozzles 60. The nozzles 60 here are arranged on a lower face of the head 6 and emerge outside the housing.

For example, the spray nozzles 60 include an outlet orifice and a spray element. This spray element is a miniature pneumatic gun, or rotary bowl, or vibrating needle made to vibrate, or an electro-nebulizer, for example of the Taylor cone type.

Reference "D" denotes the diameter of the outlet orifice of each spray nozzle 60, and "d" denotes the diameter of a droplet of coating product belonging to the aerosol stream 61.

The diameter D of the outlet orifice of the spray nozzles 60 here is greater than or equal to 100 μm and less than or equal to 600 μm.

The diameter d of the droplets of coating product is strictly smaller than the diameter D of the outlet orifice of the spray nozzles 60. For example, the diameter d of the droplets is greater than or equal to 1 μm and less than or equal to 80 μm, preferably comprised between 30 μm and 50 μm.

Preferably, the diameter of one droplet of the aerosol stream 61 here is measured when this droplet moves in the aerosol stream and has a spherical shape.

In this example, the nozzles 60 are identical to one another and therefore have a same diameter D.

The head 6 is suitable for being placed at a distance H from the surface to be coated. The distance H is less than or equal to 200 mm, preferably comprised between 5 mm and 50 mm, still more preferably comprised between 10 mm and 30 mm.

For example, the control unit 20 is programmed to keep the head 6 at the distance H from the surface S during its movement, for example from a predefined control program and/or based on positioning data of the head 6 provided by position sensors, not illustrated.

Reference "I" denotes the maximum diameter of the deposition surface of each aerosol stream 61. The nozzle 60 here is configured so that the aerosol stream 61 has a deposition surface area on the surface S that is less than or equal to 10 $cm^2$, preferably less than or equal to 5 $cm^2$.

The nozzles 60 are positioned such that the respective aerosol streams 61 formed by each nozzle 60 are joined, i.e., adjacent in pairs so as to form, at the surface S, a composite aerosol stream with no discontinuities. The aerosol streams 61 are said to be in contact with one another. For example, the respective geometric centers of the nozzles 60 are separated in pairs by a distance comprised between 0.1 cm and 2 cm.

In this way, the head 6 allows the application, on the surface S, of a continuous and homogenous strip B of coating product.

In the illustrated example, the aerosol streams 61 have a nonzero overlap in pairs. Here, reference I-R denotes the overlap distance between two adjacent aerosol streams 61, this overlap distance here being measured as an example between the edges of the adjacent individual aerosol streams 61, along a line parallel to the surface S and connecting the geometric centers of the respective deposition surfaces of the corresponding aerosol streams 61. The overlap rate is for example defined as the ratio between the distances I-R and I. For example, the overlap rate is greater than or equal to 5%. Alternatively, the overlap rate is substantially equal to 50%, or substantially equal to 66%, or substantially equal to 75%. "Substantially equal" here refers to equal to within 10%.

In a known manner, the layer of paint deposited individually by each of the aerosol streams 61 to form the strip B has a trapezoidal section with a width equal to the diameter I previously described. This width is measured at mid-height of this layer with a trapezoidal section, between the opposite inclined sides of this trapezoid.

The overlap rate equal to 5% is for example obtained by arranging the head 6 so that the layers with a trapezoidal section produced by two aerosol streams 61 intersect at mid-height of their inclined sides. This makes it possible to obtain a strip B having a desired thickness with a single deposition operation, at the expense of a few irregularities.

For example, the overlap rate of 50% is obtained by arranging the head 6 so that the distance I-R between the two aerosol streams 61 is equal to half the width I of each of these aerosol streams 61.

Alternatively, however, the overlap distance I-R can be chosen to be zero, the overlap rate then being zero.

The aerosol streams 61 formed by the nozzles 60 thus together form a so-called composite aerosol stream having a width L greater than the width of the individual streams 61. The overlap is in particular due to the arrangement and spacing of the nozzles 60 on the head 6 and the choice of the distance H, as previously described. The width L here is measured along a geometric plane perpendicular to the movement direction of the head 6. The width L is greater than or equal to 20 mm, preferably greater than or equal to 50 mm at the surface S.

In this way, the head 6 is capable of depositing coating product on a larger surface than the deposition surface of a single aerosol stream 61, but without encountering the drawbacks of the known systems, which include only one nozzle.

Figure 3:
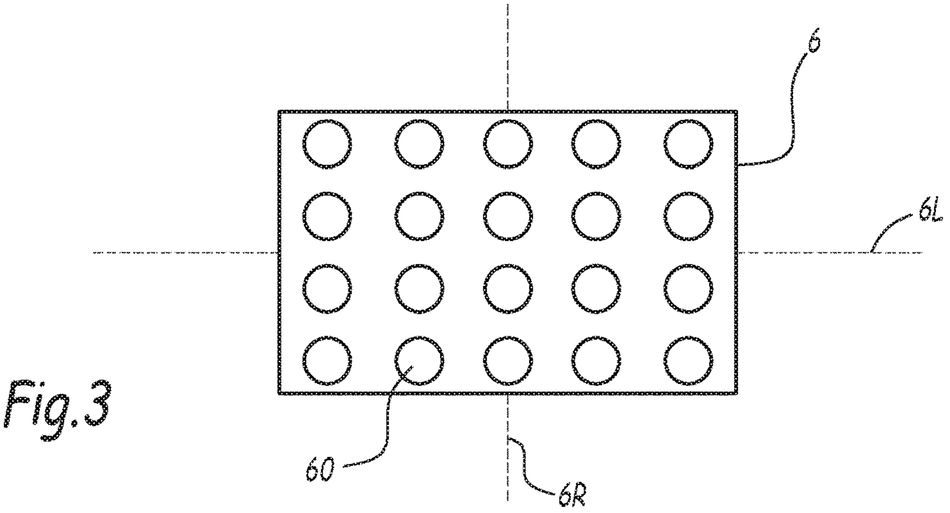
FIG. 3 is a schematic illustration of a lower face of the application head showing the positioning of spray nozzles of the product.

Preferably, as illustrated in FIG. 3, the nozzles 60 are aligned on the lower face of the head 6, along one or several columns and/or one or several rows. The columns and rows are preferably rectilinear. Here, the rows are parallel to the movement direction of the head 6, while the columns are perpendicular to the rows.

The nozzles 60 here, as an illustration, are distributed along four rectilinear columns parallel to one another and along five rows parallel to one another and perpendicular to the columns. The columns are denoted "6L" and the rows are denoted "6R".

The positioning of the nozzles 60 in several rows 6R makes it possible to obtain a strip B with a greater width L. The positioning of the nozzles 60 in several columns makes it possible to increase the thickness of the deposited strip B.

Alternatively, other spatial positioning of the nozzles 60 is possible. For example, the nozzles 60 are positioned in staggered rows on the lower face of the head 6, or in non-rectilinear columns or rows, for example having undulations. Likewise, the number of nozzles 60 can be chosen differently.

Advantageously, if the nozzles 60 have a significant bulk that does not make it possible to bring the nozzles 60 of a same row or a same column close enough together to obtain a desired overlap of the aerosol streams 61, then these nozzles 60 are arranged in staggered rows along a same row or column, respectively.

Owing to the invention, by combining several spray nozzles 60 each creating an aerosol stream 61 of coating product, the application head 6 is thus able to deposit a wide enough strip of coating product on the surface S with a satisfactory precision. By creating several small aerosol streams 61 a small distance from the surface S, the deposition of individual drops on the surface S is more easily controlled, rather than with a single large aerosol stream generated far away from the surface S, i.e., having an impact width, at the surface S, greater than 100 mm. The unwanted depositions, or “overspray”, are therefore decreased and the application yield is increased. Being able to deposit the coating product on a large surface makes the application head 6 usable in industrial methods having a fast pace, and for which the time dedicated to the coating product must not be excessive.

Advantageously, the nozzles 60 are each switchable, selectively and reversibly, between an open state and a closed state. In the open state, the nozzle 60 allows the formation of the aerosol stream 61 when it is supplied with coating product, here by the supply circuit 600. In the closed state, the nozzle 60 prevents the formation of the aerosol stream 61 even when it is supplied with coating product by the supply circuit 600.

For example, each nozzle 60 further includes, to that end, a controllable valve 601 switchable between the closed state and the open state. Alternatively, the valve 601 belongs to the supply circuit 600.

Each valve 601 is able to be switched between the open state and the closed state based on a control signal 63-S delivered by an electronic control circuit 63. In this example, the circuit 63 is inserted inside the head 6 and can be controlled from the control unit 20 via a datalink, not illustrated. Alternatively, the circuit 63 can be arranged differently. For example, the circuit 63 is arranged outside the head 6, for example incorporated in the control unit 20.

For example, this control is done using executable instructions prerecorded in the circuit 63 or in the control unit 20.

The circuit 63 is suitable for controlling the valves 601 of the nozzles 60 of the head 6 independently. The circuit 63 can thus, when the nozzles 60 are arranged in columns and/or rows, jointly command the nozzles 60 in the same column or same row into a same open or closed state.

Still more advantageously, the circuit 63 is programmed to command the opening and closing of at least part of the nozzles 60 cyclically with a predefined cyclical frequency. This predefined frequency is further calculated as a function of parameters of the movement of the head 6 relative to the surface S.

In particular, when the head 6 moves relative to the surface S while following a curved path above the surface S, then the proximal end of the head 6, i.e., that situated closest to the curve center of the trajectory, moves with a slower speed than the distal end of the head 6, which is situated opposite, furthest from the curve center. In such a case, the quantity of coating product sprayed by the head 6 must be modulated so as to guarantee good homogeneity of the deposition of coating product over the entire width L of the strip B. In particular, the head 6 must be controlled to deposit less coating product on its proximal end than on its distal end, in particular to prevent the thickness of the strip B from becoming larger on the proximal end side than on the distal end side.

Thus, the nozzles 60 situated on the proximal end of the head 6 are opened, then closed in succession at the cyclical frequency so as to deposit less coating product than the nozzles 60 situated at the distal end, the latter remaining open here. The cyclical frequency here is a function of the curve radius of the trajectory.

For example, the movement parameters are provided to the circuit 63 by the control unit 20, as a function of a movement setpoint program of the head 6 and/or as a function of data measured by the movement sensors. For example, the movement parameters include the movement speed of each nozzle 60 relative to the surface S.

Figure 4:
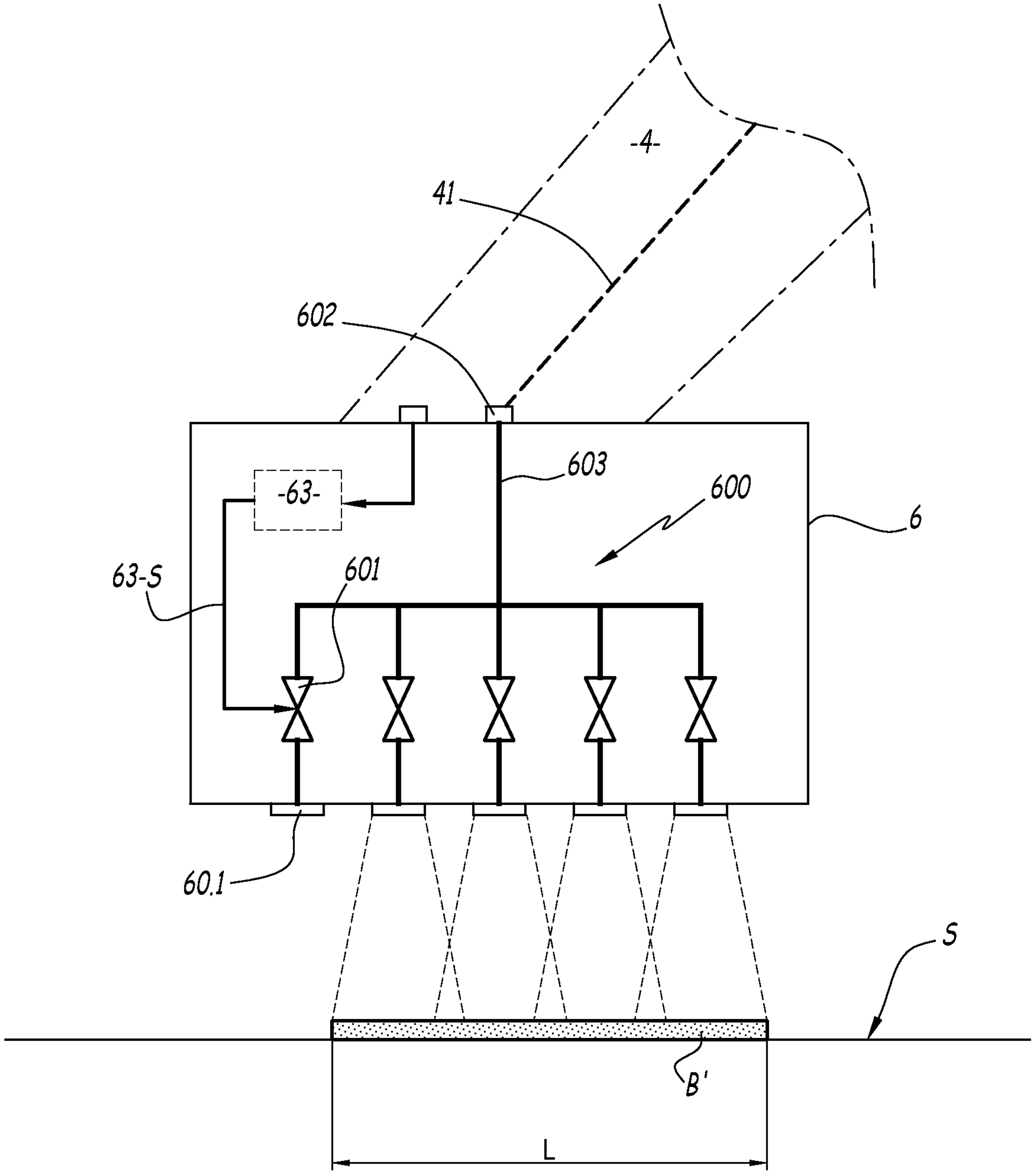
FIG. 4 is a schematic illustration of the application head of FIG. 2 in which one of the spray nozzles is in a closed state.

In FIG. 4, one of the spray nozzles 60, here bearing reference 60.1, is illustrated in its closed state. Thus, this nozzle 60.1 does not create any aerosol stream 61. Reference L' denotes the width of the composite aerosol stream formed by the head 6 in this case. The width L' is strictly smaller than the width L. As a result, the head 6 deposits a narrower strip of product B' than the strip B.

Figure 5:
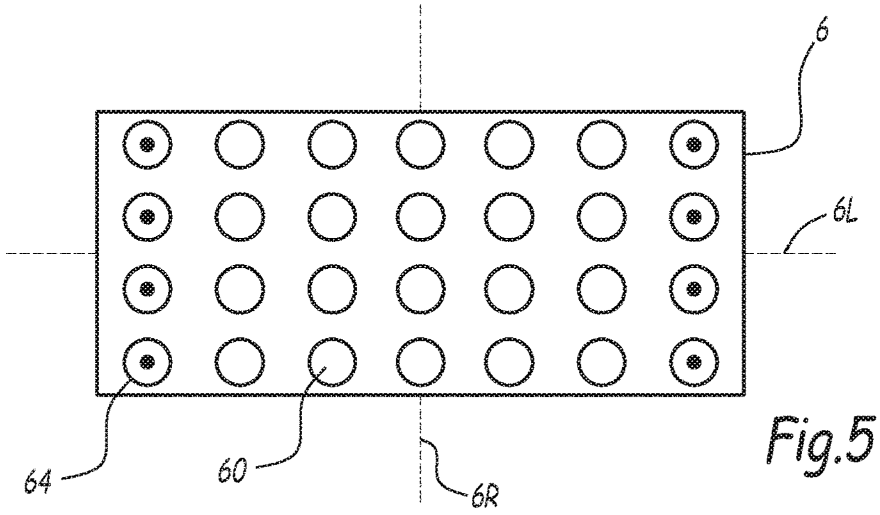
FIG. 5 is a schematic illustration of the lower face of another embodiment of an application head according to the invention, showing the arrangement of spray nozzles and additional spray nozzles.
Figure 6:
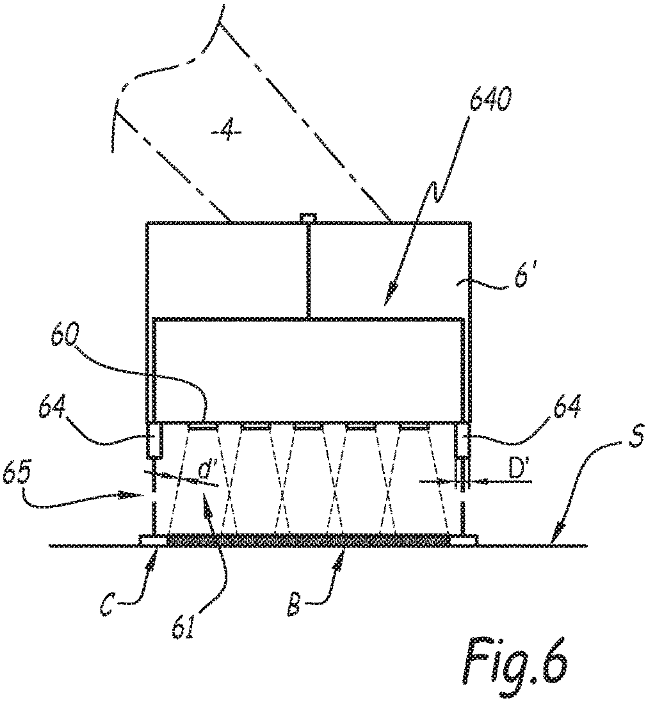
FIG. 6 is a schematic illustration, in cross-section, of the application head of FIG. 5.

FIGS. 5 and 6 show a second embodiment of the application head 6. The elements of the application head according to this embodiment that are similar to the first embodiment bear the same references and are not described in detail, inasmuch as the above description can be transposed to them.

The application head 6' in particular differs from the head 6 in that it further includes one or several secondary spray nozzles 64, also called additional spray nozzles. The nozzles 64 are separate from the nozzles 60.

The additional nozzles 64 are each configured to generate a unitary stream 65 of coating product of the dropwise type. Thus, the nozzles 64 do not allow the formation of an aerosol stream similar to the aerosol stream 61. For example, the nozzles 64 each include an outlet orifice, with a diameter denoted D', and a dropwise ejection system with a piezoelectric element or an obstructing valve.

The diameter D' is preferably strictly smaller than the diameter D of the nozzles 60, such that the droplets of coating product of the stream 65 have the smallest possible diameter, while allowing the flow of the coating product that may contain solid particles. The drops created in a dropwise manner have a diameter d' larger than the diameter d of the drops of the aerosol stream 61, the latter being smaller than the diameter D of the nozzle 60. For example, the diameter d' is substantially equal to the diameter D'. For example, the diameter D' is less than or equal to 0.8 D.

The stream 65 leads to the deposition of a strip C of coating product on the surface S. The strip C has a width smaller than the width L of the strip B. The strip C is adjacent to the strip B without having any discontinuity with the strip B.

To that end, the nozzles 64 are positioned on at least one edge of the application head 6', adjacent to the nozzles 60, such that the strip C is adjacent to the strip B.

In this example, the nozzles 64 are positioned in rows situated on opposite end edges of the lower face of the head 6, on either side of the central zone of this lower face on which the nozzles 60 are positioned. Thus, the nozzles 64 surround the nozzles 60. Alternatively, the nozzles 64 could be arranged differently, for example on end columns of the head 6. The nozzles 64 may also be positioned on only one edge of the head 6.

In this example, the additional spray nozzles 64 are supplied by a supply circuit 640 separate from the supply system 600. In this way, the spray nozzles 64 are suitable for spraying an additional coating product separate from the coating product sprayed by the spray nozzles 60.

Such a configuration is particularly advantageous in the case where the coating product is a liquid in which solid particles are in suspension. This is for example the case for metallic paints, which include metal particles or flakes in suspension in the liquid paint. This is also the case for paints filled with mica, glass or other particles intended to give a visual appearance with a particular effect or to improve certain mechanical or physical properties of the layer of coating product, for example to make it more scratch-resistant.

When the spray nozzles 64 have a diameter D' smaller than the diameter D of the spray nozzles 60, the nozzles 64 are preferably not directly supplied with metallized paint, since there is a risk of the metal flakes obstructing the nozzles 64. In this case, corresponding paint with no metal flakes is provided for the supply circuit 640, while the metallized paint comprising the flakes is provided to the supply circuit 600. It is also possible to use a paint with a shade slightly different from the shade obtained with strictly identical paint, but without flakes, in order to obtain an identical shade once applied.

Alternatively, however, the same coating product is supplied to the nozzles 60 and the nozzles 64. This is particularly interesting for paint without particles having a metallic effect. The supply circuit 640 could, in this case, be supplied jointly with the supply circuit 600, for example by the supply pipe 41. However, two separate supply circuits are preferable to offset the different operating conditions (produced flow rate, produced pressure) necessary for the nozzles 60 and the nozzles 64 to work simultaneously.

The nozzles 64 thus make it possible to improve the quality of the product deposition on the surface S, in particular so as to have sharper lateral edges. Alternatively, the nozzles 64 can be different due to their geometry, positioning or angular orientation.

Figure 7:
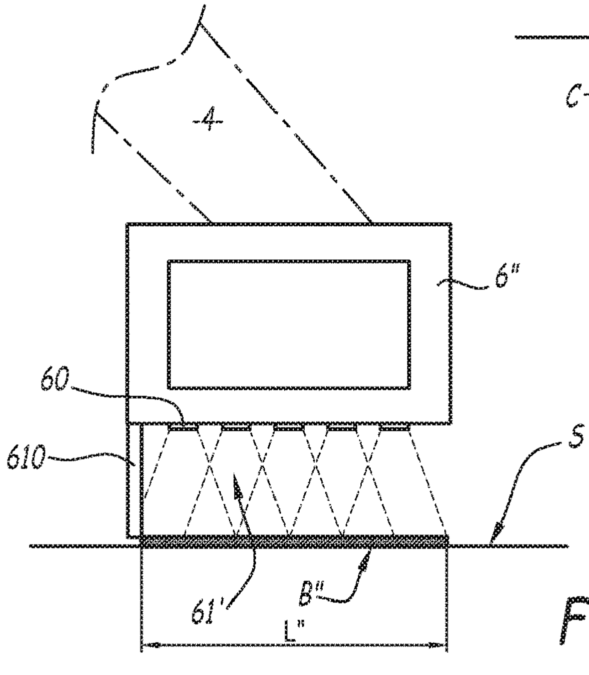
FIG. 7 is a schematic illustration, in side view, of another embodiment of an application head according to the invention, including a guide mask.

FIG. 7 shows a third embodiment of the invention. The elements of the application head 6" according to this embodiment that are similar to the first embodiment bear the same references and are not described in detail, inasmuch as the above description can be transposed to them.

The head 6" differs from the head 6 in that it further includes a removable or retractable mask 610 situated on an edge of the head 6", so as to at least partially clip one of the aerosol sprays, here denoted 61', emitted by one of the nozzles 60. The mask 610 here is retractable by a translational movement parallel to the propagation direction of the aerosol spray. This movement is for example ensured by a motor, not illustrated, commanded by the control unit 20.

In this way, the deposited paint strip B' has a sharper and better delimited border than in the case where no masking is done.

Advantageously, the mask 610 is made from an electrically conductive material and is suitable for being connected to an electrically polarizing circuit to electrically polarize this mask 610. This makes it possible to exert an electric guide field on the droplets of the aerosol streams emitted by the nozzles 60, the coating product being electrically polarized beforehand with an opposite polarity. Thus, the electric guide field makes it possible to increase the sharpness of the edge of the paint strip B", similarly to what is explained below in reference to the embodiment of FIG. 9.

Alternatively, one copy of the mask 610 can be placed on each of the lateral edges of the head 6".

Figure 8:
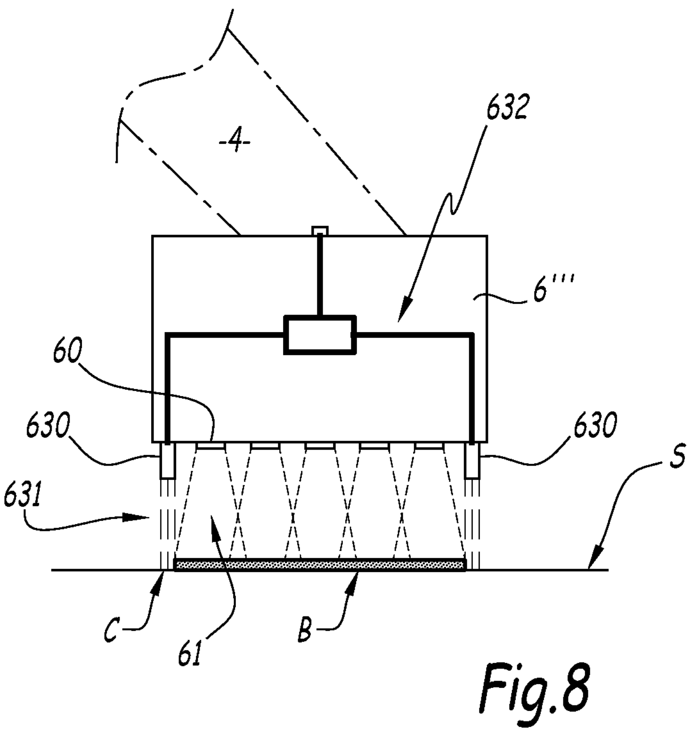
FIG. 8 is a schematic illustration, in sectional view, of another embodiment of an application head according to the invention, including an air guiding device of the coating product.

FIG. 8 shows a fourth embodiment of the invention. The elements of the application head 6'" according to this embodiment that are similar to the first embodiment bear the same references and are not described in detail, inasmuch as the above description can be transposed to them.

The application head 6'" further includes an application device for a stream of air guiding the sprayed coating product. This device in particular includes air discharge orifices at 630 connected to a compressed air supply circuit 632, for example supplied via a pipe dedicated to that end by the system 1. The orifices 630 are suitable for spraying a stream 631 of guide air adjacent to at least part of the aerosol stream 61 leaving the spray nozzles 60 and oriented along the propagation direction. This guiding air stream thus constitutes a barrier that the droplets of coating product cannot cross. Thus, the deposition of the droplets outside a target area of the surface S is limited. The strip B of product thus deposited also has sharper edges. The orifices 630 here are placed on lateral edges of the lower face of the head 6'".

According to another alternative, not shown, the orifices 630 can be placed differently, for example placed at each nozzle 60 to form several independent streams. The streams of air 631 can be oriented so as to be convergent or divergent relative to the propagation direction of the aerosol stream 61.

Such a device can advantageously be used with the application heads 6, 6' or 6".

Figure 9:
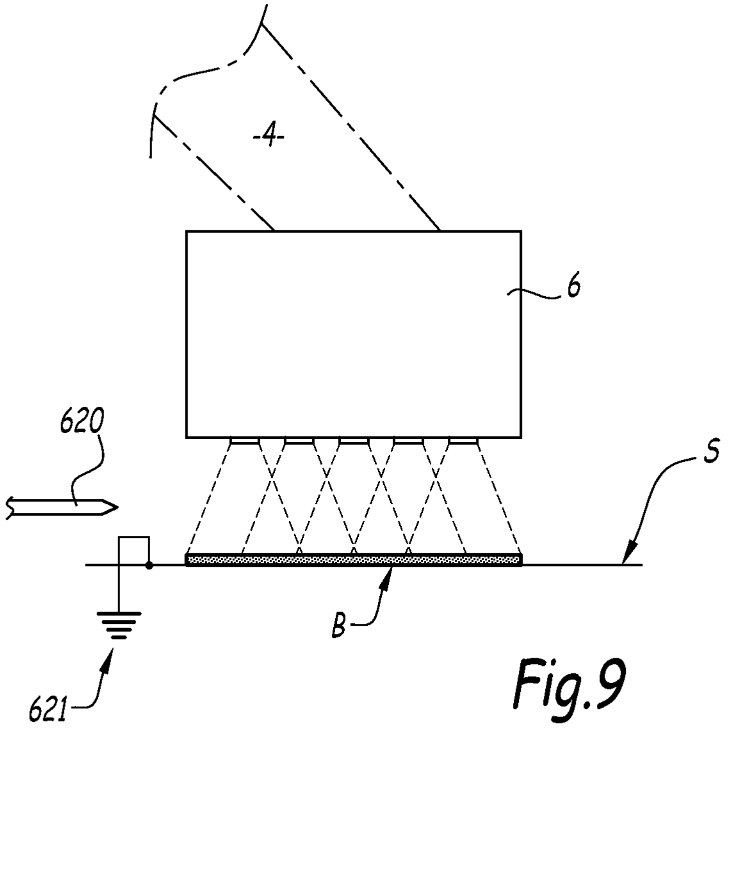
FIG. 9 is a schematic illustration of another embodiment of an application head according to the invention, in which the system includes an electrostatic guiding system of the coating product.

FIG. 9 shows a fifth embodiment of the invention. The elements of the element according to this embodiment that are similar to the first embodiment bear the same references and are not described in detail, inasmuch as the above description can be transposed to them.

This system in particular differs from the system 1 in that it further includes an electrode 620 suitable for applying an electrical field on the aerosol streams 61 emitted by the spray nozzles 60. Thus, the droplets of the aerosol streams 61 are electrically charged with a nonzero electrical charge. In parallel, the surface S is electrically connected to an electric ground 621. In this way, at least some of the droplets are attracted, under the action of an electrostatic force, toward the surface S to be coated. In this way, the deposition of the droplets outside a target area of the surface S is limited. The strip B of product thus deposited also has sharper edges.

As an illustration, an electrical field is generated in the spray axis between the electrode 620 and the surface S to be coated. This electrical field E accelerates the charged droplets during their journey toward the surface S. An electrostatic force with intensity $F=qE$, where q is the elementary electric charge, is superimposed on the earth's gravitational force and the frictional forces of the air. The electric force is tangential to the field lines, which converge toward the surface S. Some droplets on the rectilinear trajectories that would, in the absence of the electrical field, have arrived outside a target area of the surface S are deflected toward the latter and attracted by the target.

Furthermore, owing to the field E, the droplets are accelerated, which makes it possible to increase the distance between the nozzle 60 and the surface S to reach hard-to-access areas. This increases the deposition yield and makes it uniform.

Another advantage is the refinement of the size of the droplets sprayed by the nozzles 60, which improves the final appearance of the coating once deposited on the surface S. One of the parameters limiting the dropwise technology is the size of the outlet orifice of the nozzle, which is small and incompatible with the characteristics of many coating products other than inks, as is the case for automotive paints. The axial electrical field E between the nozzle 60 and the surface S, applied at the droplets, contributes to atomizing them even more finely. The combination of the atomization energy and the electrical field increases the extraction force of the drop from the surface of the paint film. The high voltage allows fine atomization equivalent to using nozzle orifices 60 with a larger diameter. Lastly, the increased atomization power makes it possible to improve production rhythms when the head 6 is used in an industrial production context, such as an automotive paint line.

The use of electrostatic guiding also improves the uniformity and homogeneity of the positioning of the droplets, which repel one another. They are deposited more diffusely, unlike the dropwise technologies. This lessens unwanted visual artifacts, such as marbling and linage.

According to an alternative that is not shown, the application head 6 includes a device for electrically polarizing the coating product before it is sprayed by the nozzles 60. In parallel, the surface S is electrically connected to an electric ground 621. In this way, the droplets of the aerosol streams 61 are electrically polarized without needing to use an electrode 620.

Owing to this electrical polarization, at least some of the droplets are attracted, under the action of electrostatic force, toward the surface S to be coated, which makes it possible to limit the deposition of the droplets outside a target area of the surface S. The strip B of product thus deposited also has sharper edges.

The embodiments and alternatives and embodiments considered above may be combined to create new embodiments.

The invention claimed is:

1. An application head of a coating product on a surface to be coated, comprising:

at least two spray nozzles for the coating product, each spray nozzle spraying the coating product in the form of an aerosol stream, by simultaneously creating several droplets having a diameter smaller than the diameter of the outlet orifice of the spray nozzle, wherein said at least two spray nozzles are spaced apart in pairs by a distance between 0.1 cm and 2 cm, such that the aerosol streams are in contact with one another at the surface to be coated; and one or more additional spray nozzles, separate from said at least two spray nozzles, generating a dropwise stream of coating product, the dropwise stream being different from the aerosol streams of said at least two spray nozzles.

2. The application head according to claim 1, wherein said at least two spray nozzles are arranged so as to obtain an overlap between the aerosol streams produced by said at least two spray nozzles at the surface to be coated.

3. The application head according to claim 2, wherein the overlap rate between the aerosol streams produced by two adjacent ones of said at least two spray nozzles is greater than or equal to 5%, or substantially equal to 50%, or substantially equal to 66%.

4. The application head according to claim 1, wherein the diameter of the outlet orifice of each of said at least two spray nozzles is greater than or equal to 100 μm.

5. The application head according to claim 1, wherein said additional spray nozzles are positioned on at least one lateral edge of the application head and/or adjacent to some of said at least two spray nozzles.

6. The application head according to claim 1, said additional spray nozzles having an outlet orifice diameter smaller than the diameter of the outlet orifice of said at least two spray nozzles.

7. The application head according to claim 1, wherein said additional spray nozzles are supplied by a supply circuit separate from the supply circuit of said spray nozzles.

8. The application head according to claim 1, wherein said at least two spray nozzles are aligned with one another in columns and/or rows.

9. The application head according to claim 1, comprising an application device for a stream of air guiding the sprayed coating product, the application device comprising air discharge orifices suitable for spraying a stream of guide air adjacent to at least part of the aerosol streams.

10. The application head according to claim 1, comprising a removable or retractable mask, to laterally clip the aerosol stream emitted by at least some of the spray nozzles.

11. The application head according to claim 10, wherein said mask is made from an electrically conductive material and is suitable for being connected to an electrically polarizing circuit to electrically polarize said mask, the coating product being electrically polarized beforehand with an opposite polarity.

12. The application head according to claim 1, comprising at least one electrode suitable for applying an electrical field on the aerosol streams emitted by said at least two spray nozzles, the surface to be coated being connected to an electric ground of the system.

13. An application system of a coating product on a surface to be coated, comprising a multiaxial industrial robot provided with an articulated arm and an application head of the coating product fastened on the articulated arm, wherein said application head is an application head according to claim 1.

14. The application system according to claim 13, wherein the system is suitable for the distance between the application head and the surface to be coated to be less than 200 mm.

15. The application system according to claim 13, wherein the system is suitable for the distance between the application head and the surface to be coated to be between 5 mm and 50 mm.

16. The application system according to claim 13, wherein the system is suitable for the distance between the application head and the surface to be coated to be between 10 mm and 30 mm.

17. The system according to claim 13, wherein said application head is fastened to the articulated arm removably using a magnetic fastening device.

* * * * *